US009322670B2

(12) United States Patent
Mizunuma et al.

(10) Patent No.: US 9,322,670 B2
(45) Date of Patent: Apr. 26, 2016

(54) ROTATION ANGLE DETECTING DEVICE

(71) Applicant: DENSO CORPORATION, Kariya, Aichi-pref. (JP)

(72) Inventors: Takehito Mizunuma, Chiryu (JP); Tomoyuki Takiguchi, Okazaki (JP); Takamitsu Kubota, Chiryu (JP); Yoshiyuki Kono, Obu (JP)

(73) Assignee: DENSO CORPORATION, Kariya (JP)

( * ) Notice: Subject to any disclaimer, the term of this patent is extended or adjusted under 35 U.S.C. 154(b) by 50 days.

(21) Appl. No.: 14/190,626

(22) Filed: Feb. 26, 2014

(65) Prior Publication Data

US 2014/0306696 A1 Oct. 16, 2014

(30) Foreign Application Priority Data

Apr. 11, 2013 (JP) .................................. 2013-82856

(51) Int. Cl.
*G01B 7/30* (2006.01)
*G01D 5/14* (2006.01)
*G01D 5/244* (2006.01)

(52) U.S. Cl.
CPC .................. *G01D 5/14* (2013.01); *G01D 5/145* (2013.01); *G01D 5/2448* (2013.01)

(58) Field of Classification Search
CPC ....................................................... G01D 5/145
USPC ........................................ 324/207.25, 207.2
See application file for complete search history.

(56) References Cited

U.S. PATENT DOCUMENTS 6,498,479 B1 12/2002 Hamaoka et al.
2013/0018619 A1 1/2013 Hara et al.

FOREIGN PATENT DOCUMENTS

JP 61-83710 4/1986
JP 2012-137415 7/2012

OTHER PUBLICATIONS

Office Action (5 pages) dated Jan. 31, 2015, issued in corresponding Korean Application No. 10-2014-0041780 and English translation (3 pages).
Office Action (3 pages) dated Apr. 21, 2015, issued in corresponding Japanese Application No. 2013-082856 and English translation (4 pages).
Office Action (5 pages) dated Aug. 31, 2015, issued in corresponding Korean Application No. 10-2014-0041780 and English translation (4 pages).

*Primary Examiner* — Reena Aurora
(74) *Attorney, Agent, or Firm* — Nixon & Vanderhye PC

(57) ABSTRACT

A magnetism sensing element is provided to be rotatable relative to permanent magnets and outputs a magnetic force detection value, which corresponds to a perpendicular component of magnetic flux. A Hall IC calculates and outputs an output voltage, which corresponds to a relative rotational angle between the permanent magnets and the magnetism sensing element, based on the magnetic force detection value outputted by the magnetism sensing element. The Hall IC calculates the output voltage as $V2 = k \times \arcsin(V1/(VM+\alpha)) + V\text{offset}$, in which $V1$, $V2$, $VM$, $k$, $\alpha$ and $V\text{offset}$ indicate the magnetic force detection value, the output voltage, a maximum value of the magnetic force detection value, a gain, a predetermined value and a predetermined offset value.

5 Claims, 6 Drawing Sheets

ROTATION ANGLE DETECTING DEVICE

CROSS REFERENCE TO RELATED APPLICATION

This application is based on and incorporates herein by reference Japanese patent application No. 2013-82856 filed on Apr. 11, 2013.

FIELD

The present disclosure relates to a rotation angle detecting device, which detects a relative rotation angle of a rotary member relative to a magnetism generating member.

BACKGROUND

Some conventional rotation angle detecting devices detect rotation angle of a detection object, which is a rotary member, without using magnetic flux collecting members such as stators. A rotation angle detecting device disclosed in JP 3491577, for example, has no magnetic flux collecting members so that its configuration is simplified and cost is reduced. This rotation angle detecting device according to JP 3491577 calculates an output voltage value, which corresponds to a relative rotation angle between a magnetism generating member and a magnetism sensing element, based on a magnetic force detection value (detection value of magnetic force), which is applied to and detected by the magnetism sensing element. Since this rotation angle detecting device has no magnetic flux collecting members, the magnetism sensing element outputs a detection voltage, which varies in a sine waveform or a cosine waveform. The magnetic force detection value varies non-linearly near a rotation angle, where the magnetic force detection value takes a maximum value. Accuracy in rotation angle detection is likely to be lowered particularly in a range including such a rotation angle. This rotation angle detecting device therefore converts the output voltage to a value, which varies linearly with the rotation angle, by calculating the output value of the magnetism sensing element based on an arcsine function or an arccosine function.

However, in this rotation angle detecting device, the magnetic force detection value of the magnetism sensing element varies when the magnetism generating member generates less magnetism or deviates in position. In this case, the output voltage is likely to vary largely near the rotation angle, which corresponds to the maximum value of the magnetic force detection value. If the output voltage varies largely, the accuracy of rotation angle detection is lowered.

SUMMARY

It is therefore an object to provide a rotation angle detecting device, which detects a rotation angle of a rotary member with high accuracy in simple configuration.

According to one aspect, a rotation angle detecting device comprises a magnetism sensing element and a processing part. The magnetism sensing element is provided relatively rotatable to a magnetism generating member to output a magnetic force detection value corresponding to a perpendicular component of magnetic flux applied from the magnetism generating member. The processing part calculates and outputs an output voltage, which corresponds to a relative rotation angle between the magnetism generating member and the magnetism sensing element, based on the magnetic force detection value outputted by the magnetism sensing element. The processing part calculates the output voltage as $V2 = k \times \arcsin(V1/(VM+\alpha)) + V_{offset}$ or $V2 = k \times \arccos(V1/(VM+\alpha)) + V_{offset}$, in which V1, V2, VM, k, $\alpha$ and Voffset indicate the magnetic force detection value, the output voltage, a maximum value of the magnetic force detection value, a gain, a predetermined value and a predetermined offset value.

EMBODIMENT

Figure 1:
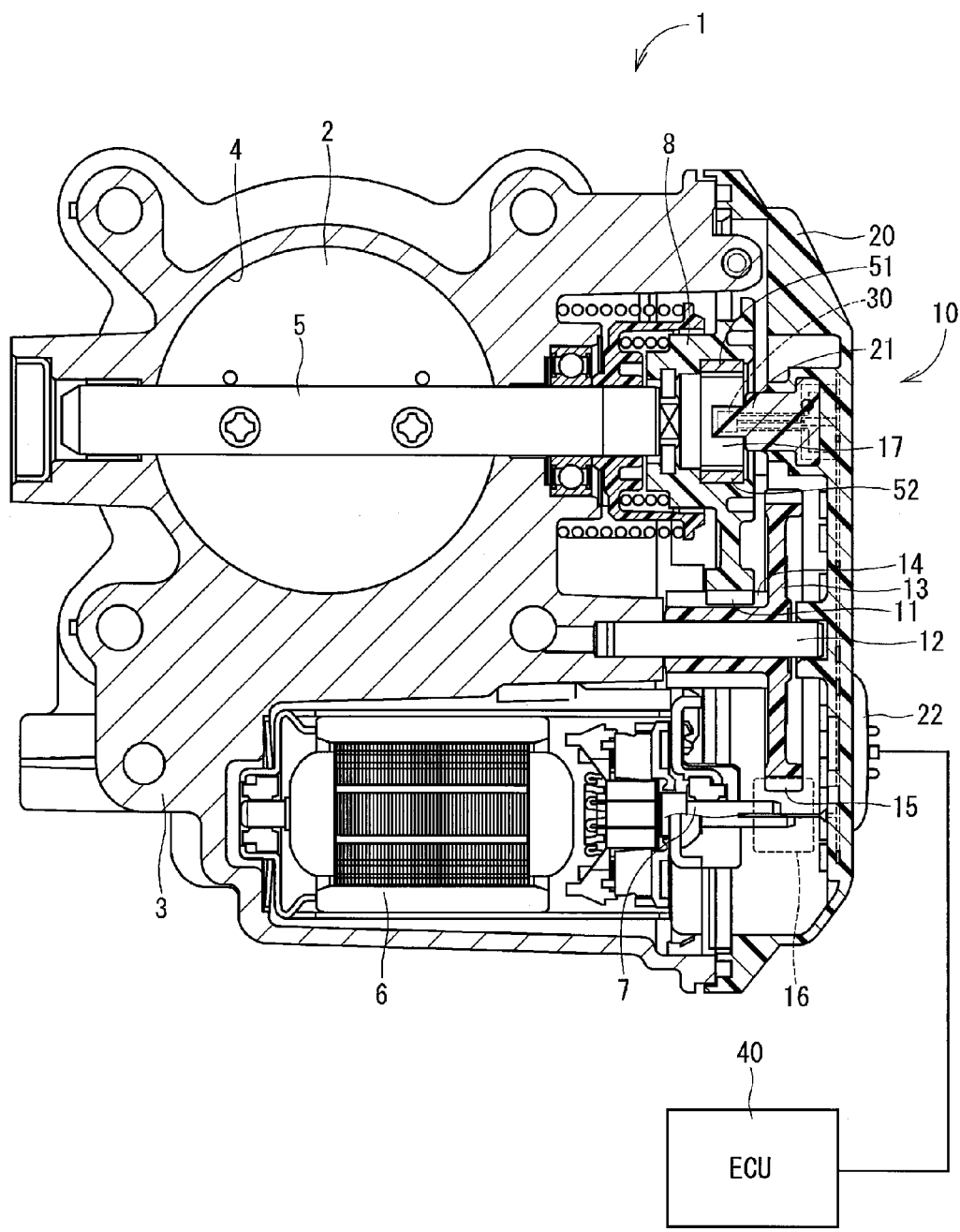
FIG. 1 is a sectional view showing a rotation angle detecting device according to a first embodiment and a rotary driving apparatus using the rotation angle detecting device.

A rotation angle detecting device will be described in detail below with reference to plural embodiments shown in the accompanying drawings. Substantially the same configuration parts among the plural embodiments are designated by same reference numerals thereby to simplify the description.

(First Embodiment)

A rotation angle detecting device according to a first embodiment and a rotary driving apparatus using the same is shown in FIG. 1. A rotation detecting device 10 is used to detect a rotation angle of a throttle valve 2 provided as a rotary member in an air intake system of a vehicle for example. The rotary driving apparatus 1 includes a housing 3, a valve shaft 5, a motor 6 and the like in addition to the rotation angle detecting device 10.

The housing 3 is formed of a metal such as aluminum, for example, and has in its inside a passage, which is generally in a cylindrical shape. The passage 4 forms a part of an air intake passage, which leads air to an internal combustion engine. The valve shaft 5 is formed in a rod shape and provided generally perpendicularly to a passage axis of the passage 4 in a manner to be rotatable relative to the housing 3.

The throttle valve 2 is formed generally in a disk shape and fixed to the valve shaft 5 by, for example, screw members or the like. The throttle valve 2 thus rotates with the valve shaft 5 to open and close the passage 4 as the valve shaft 5 rotates. As a result, the amount of air suctioned into the internal combustion engine is regulated.

The motor 6 is an electrically-driven motor, which is rotationally driven with electric power supply. The motor 6 is a motor with brushes. The motor 6 has a motor shaft 7. The motor 6 rotates and outputs torque from the motor shaft 7. The motor 6 is provided in the housing 3 such that the motor shaft 7 is generally in parallel with the valve shaft 5.

A holder 8 of a cylindrical shape formed of resin, for example, is attached at one end of the valve shaft 5. Permanent magnets 51, 52 are provided as a magnetism generating member at a radially inside part of the holder 8. Thus, the holder 8 and the permanent magnets 51, 52 are rotatable with the valve shaft 5 and the throttle valve 2.

The rotation detecting device 10 is attached to the housing 3 in a manner to cover one end side of the valve shaft 5, which includes the holder 8 and the permanent magnets 51, 52, and one end side of the motor shaft 7. A gear 11 is formed on an outer wall of the holder 8 partially in a peripheral direction. A shaft 12 formed in a rod shape is provided in the housing 3 in a manner to be generally parallel to the valve shaft 5 and the motor shaft 7. The shaft 12 is not rotatable at one end thereof relative to the housing 3. The other end of the shaft 12 is supported by a cover 20 of the rotation angle detecting device 10, which will be described later.

A gear set 13 is formed on the shaft 12 in a manner to be relatively rotatable to the shaft 12. The gear set 13 is formed of resin, for example, and has a first gear 14, which is engageable with the gear 11 of the holder 8. The gear set 13 has a second gear 15, an outer diameter of which is larger than the first gear 14. A gear member 16, which is engageable with the second gear 15 of the gear set 13, is fixed to one end of the motor shaft 7. The motor 6 is driven to rotate with electric power supply form a battery (not shown).

When the motor 6 is driven rotationally, rotation (torque) of the motor 6 is transferred to the throttle valve 2 through the motor shaft 7, the gear member 16, the gear set 13, the holder 8 and the valve shaft 5. The throttle valve 2 thus rotates in the passage 4 to open and close the passage 4 (air intake passage). The rotation angle detecting device 10 detects the rotation angle (open angle) of the throttle valve 2.

The rotation angle detecting device 10 includes, as shown in FIG. 1, the cover 20, a support member 21, a Hall IC 30 and the like. The cover 20 is formed of resin in a disk shape, for example, and attached to the housing 3 in a manner to cover the one end side of the valve shaft 5, that is, the holder 8 and the permanent magnets 51, 52, and the one end side of the motor shaft 7.

The support member 21 is formed of resin, for example, and integrally with the cover 20. The support member 21 is arranged such that its top end part is located in the middle of the holder 8. The Hall IC 30 is insert-molded at the top end part of the support member 21. The support member 21 thus supports the Hall IC 30. The Hall IC 30 and the permanent magnets 51, 52 are relatively rotatable each other.

Figure 2A:
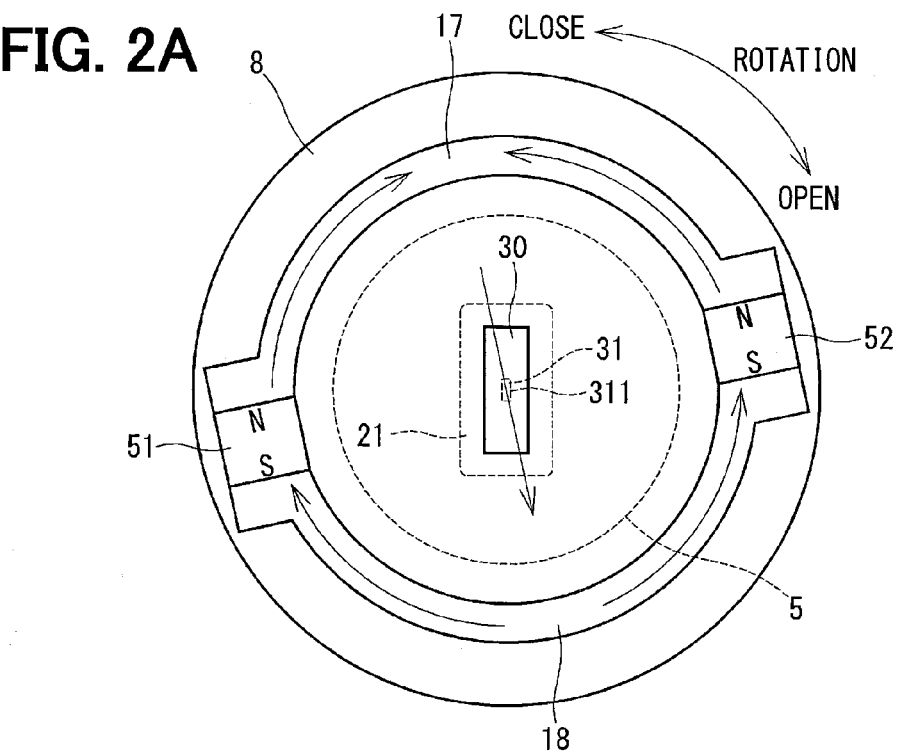
FIG. 2A and FIG. 2B are schematic views showing a magnetism sensing element and its surrounding part of the rotation angle detecting device according to the first embodiment in cases when a rotation angle of a throttle valve is 0° and 12°, respectively.
Figure 2B:
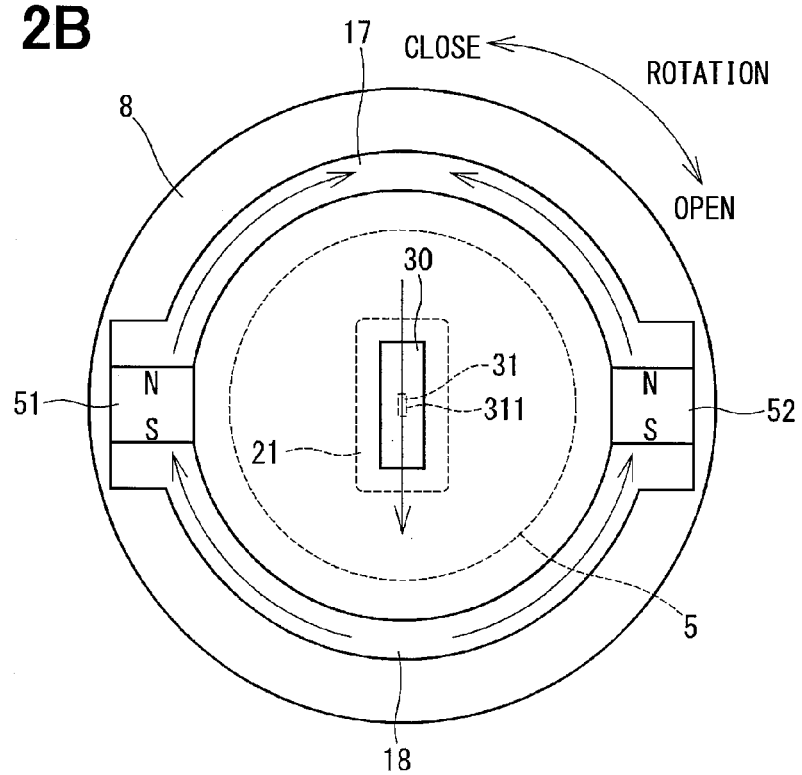

As shown in FIG. 2A and FIG. 2B, the Hall IC 30 includes a magnetism sensing element 31. The magnetism sensing element 31 is a Hall element, for example, which has a magnetism sensing plane 311, and converts a magnetic force detection value corresponding to a perpendicular component of the magnetic flux to an output voltage and outputs this output voltage. That is, the magnetism sensing element 31 outputs a voltage, which corresponds to a magnetic force detection value varying with a magnitude of the perpendicular component of magnetic flux passing through the magnetism sensing plane 311.

The cover 20 has a connector 22. Plural terminals (not shown) are provided inside the connector 22. Those terminals are connected to the motor 6 or the Hall IC 30. The permanent magnets 51, 52 provided as a magnetism generating member are arranged in the holder 8 to be in point-symmetry relative to the axis of the valve shaft 5, that is, to face each other in the radial direction. Yokes 17, 18 formed in an arcuate shape are provided to sandwich the permanent magnets 51, 52 in the holder 8. Both end parts of the yoke 17 are in contact with N-poles of the permanent magnets 51, 52. Both end parts of the yoke 18 are in contact with S-poles of the permanent magnets 51, 52. A magnetic circuit is thus formed so that the magnetic fluxes generated from the N-poles of the permanent magnets 51, 52 flow through the yoke 17, jump from the middle part of the yoke 17 to the middle part of the yoke 18 diametrically, and flow to the S-poles of the permanent magnets 51, 52 through the yoke 18.

The Hall IC 30 is arranged to be located in the center of a circle, which is formed by the yoke 17 and the yoke 18. As a result, the magnetic fluxes pass through the magnetism sensing element 31 regardless of the rotational positions of the permanent magnets 51, 52, that is, the rotational position of the valve shaft 5.

FIG. 2A shows the Hall IC 30 and its surrounding state in a case that the throttle valve 2 is fully closed (throttle open angle is 0). In this case, the magnetic flux jumps from the yoke 17 to the yoke 18 with an angle of about 12° relative to the magnetism sensing plane 311. FIG. 2B shows the Hall IC 30 and its surrounding state in a case that the throttle valve 2 is open about 12° from the fully closed position. In this case, the magnetic flux jumps from the yoke 17 to the yoke 18 with an angle of about 0° relative to the magnetism sensing plane 311. Since the perpendicular component of the magnetic flux passing through the magnetism sensing plane 311 is 0 in this case, the magnetic force detection value outputted from the magnetism sensing element 31 is 0.

Figure 3:
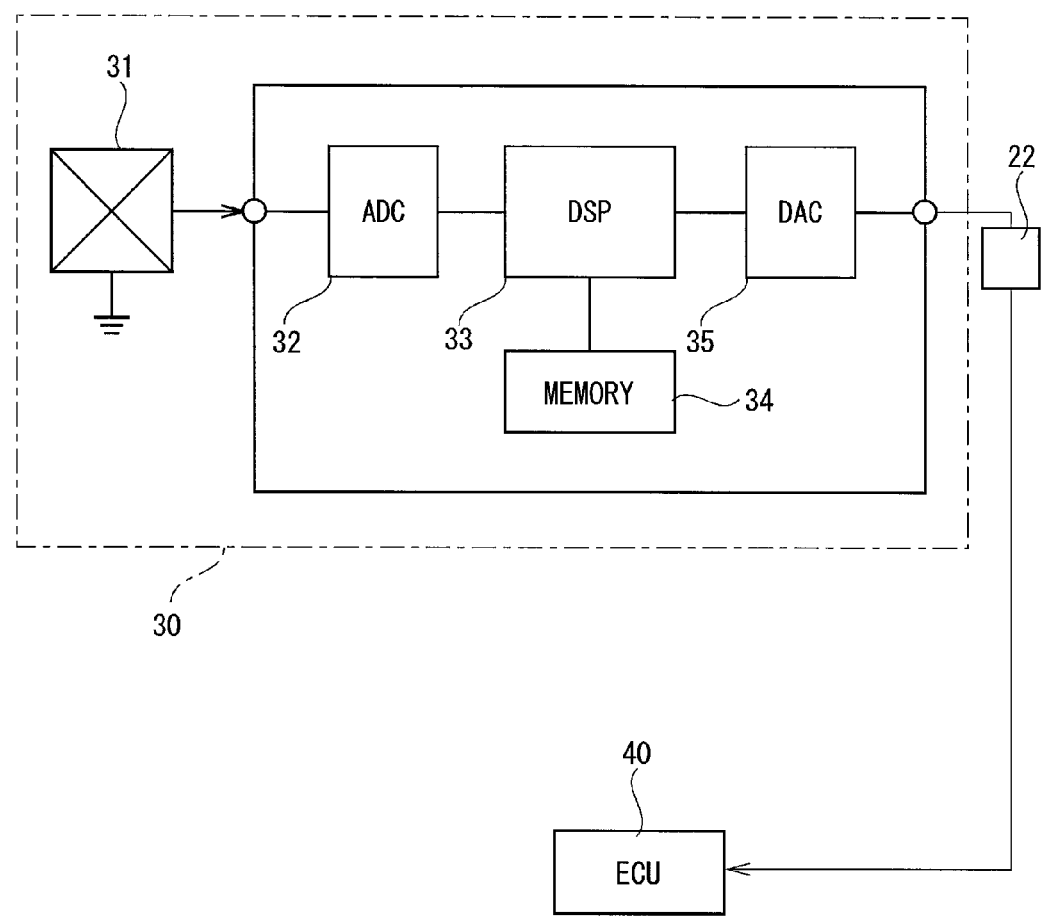
FIG. 3 is a block diagram showing a configuration of a Hall IC in the rotation angle detecting device according to the first embodiment.

As shown in FIG. 3, the Hall IC 30 includes, in addition to the magnetism sensing element 31, an AD converter (ADC) 32, a digital signal processor (DSP) 33, a memory 34, a DA converter (DAC) 35 and the like. The AD converter 32 converts an analog voltage (magnetic force detection value) outputted from the magnetism sensing element 31 to a digital signal and outputs the magnetic force detection value to the DSP 33. Here the analog voltage outputted from the magnetism sensing element 31 is assumed to be a magnetic force detection value V1.

The DSP 33 calculates an output value V2, which corresponds to a relative rotation angle between the permanent magnets 51, 52 and the magnetism sensing element 31, based on the magnetic force detection value V1 outputted from the AD converter 32 and outputs it to the DA converter 34. The DSP 33 corresponds to a processing part. The memory 34 is a storage device such as an EEPROM, for example, which stores programs and parameters for use in a data processing operation by the DSP 33.

The DA converter 35 converts the output value V2 corresponding to the magnetic force detection value V1 outputted from the DSP 33 to an analog voltage. The output value V2 outputted from the DA converter 35 is applied to an electronic control unit (ECU) 40 through the connector 22.

The ECU 40 is a microcomputer, which includes a CPU, a ROM, a RAM, an I/O and the like. The ECU 40 controls a vehicle in an integrated manner by controlling various apparatuses and equipment based on signals outputted from various sensors provided at various locations in the vehicle. The ECU 40 detects the rotation angle, that is, the open angle, of the throttle valve 2 based on the output value V2 outputted from the DA converter 35.

The ECU 40 controls rotational driving of the motor 6 by regulating the electric power supplied from the battery to the motor 6 through the connector 22. The ECU 40 controls the open angle of the throttle valve 2 by controlling the rotational driving of the motor 6 based on, for example, a load condition and the like of the internal combustion engine.

The DSP 33 calculates the output value V2 in the following manner. The DSP 33 calculates the output value V2 by using the following equation (1), in which VM, k, α and Voffset indicate a maximum value of the magnetic force detection value, a gain, a predetermined value and a predetermined offset value, respectively.

$$V2 = k \times \arcsin(V1/(VM+\alpha)) + Voffset \quad (1)$$

Figure 4:
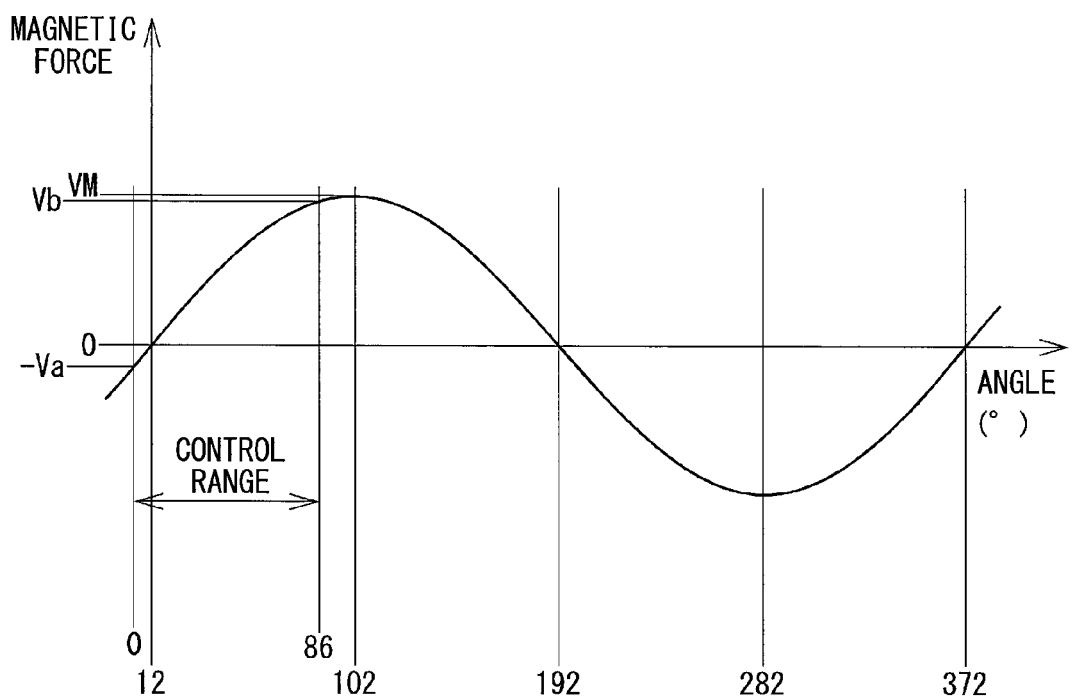
FIG. 4 is a graph showing a relation between a rotation angle of the throttle valve and an output voltage of the magnetism sensing element of the rotation angle detecting device according to the first embodiment.

VM will be described further with reference to FIG. 4. As shown in FIG. 4, the magnetic force detection value outputted from the magnetism sensing element 31 is a sine wave shape assuming that the horizontal axis indicates the relative rotation angle between the magnetism sensing element 31 and the permanent magnets 51, 52, that is, the rotation angle of the throttle valve 2. The voltage, which is outputted at the angle of 0° and shown in FIG. 4, is the magnetic force detection value outputted from the magnetism sensing element 31 under the case shown in FIG. 2A, that is, when the throttle valve 2 is fully closed. Under the case shown in FIG. 2B, that is, when the throttle valve 2 is opened rotated 12° from the fully closed position, the magnetic force detection value outputted from the magnetism sensing element 31 is the magnetic force detection value when the throttle open angle is 12° in FIG. 4.

As shown in FIG. 4, in a case that the magnetism sensing element 31 and the permanent magnets 51, 52 rotate relatively 360°, the maximum value of the magnetic force detection value (V1) outputted from the magnetism sensing element 31 is VM, which is outputted when the open angle is 102°. That is, VM is equal to an amplitude of a sine wave signal, which corresponds to the magnetic force detection value outputted from the magnetism sensing element 31.

The throttle valve 2 is controllable by the ECU 40 to open in a control range from 0° to 86° (fully closed 0°, fully opened 86°). As a result, in the control range of the throttle valve 2, the magnetic force detection value V1 varies between −Va and Vb.

After the rotary driving apparatus 1 is assembled, a measuring and writing device (not shown) is connected to the connector 22 of the cover 20. The measuring and writing device drives the throttle valve 2 to rotate by supplying the electric power to the motor 6 through the connector 22. The measuring and writing device measures the magnetic force detection value (−Va), which is outputted from the Hall IC 30 (magnetism detecting element 31) when the throttle valve 2 is fully closed, and the magnetic force detection value (Vb), which is outputted from the Hall IC 30 when the throttle valve 2 is fully opened. The measuring and writing device estimates the maximum value VM of the magnetic force detection value V1 based on the measured magnetic force detection values (−Va and Vb). The measuring and writing device writes the estimated VM in the memory 34. The DSP 33 is thus capable of using VM in the equation 1.

The gain k is variable with temperature. The predetermined value a in the equation (1) is about 0.2 to 0.25 folds of VM (that is, VM/5 to VM/4). The predetermined offset value Voffset in the equation (1) is set in consideration of a minimum value of the magnetic force detection value, which is possible to be outputted from the Hall IC 30 when the throttle valve 2 is being controlled.

Figure 5:
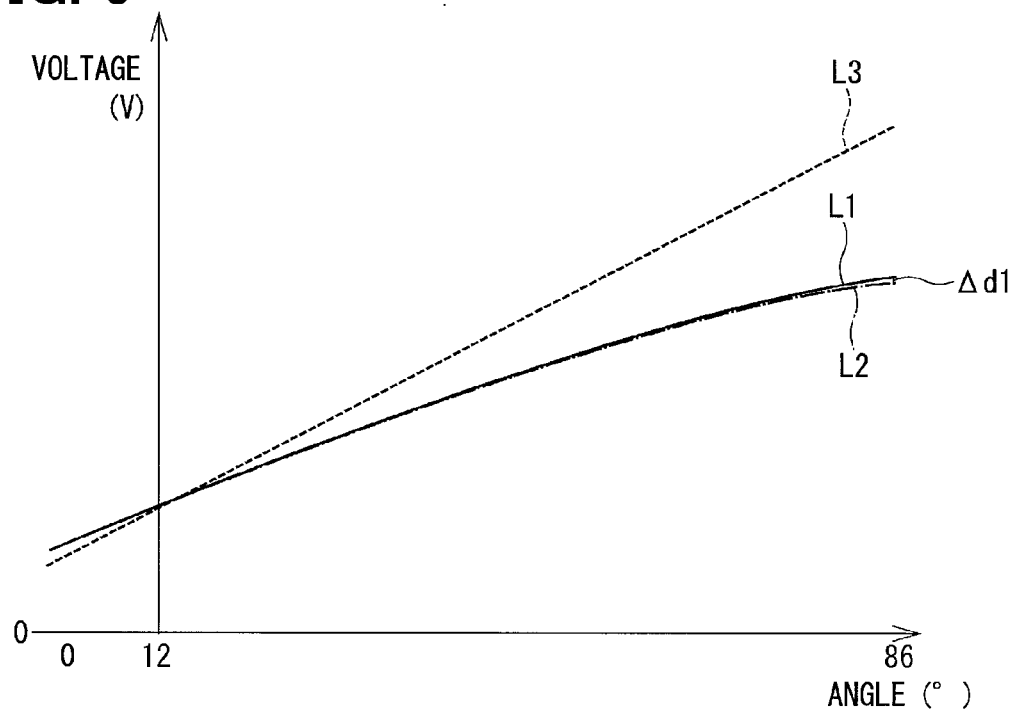
FIG. 5 is a graph showing an output voltage of the Hall IC of the rotation angle detecting device according to the first embodiment.

FIG. 5 shows the output value V2, which is outputted from the Hall IC 30 (DA converter 35) when the throttle valve 2 is being controlled, by a solid line L1. The output value V2, which is produced in the rotary driving apparatus 1 when the magnetic force detection value V1 varies 1%, is calculated by using the following equation (2).

$$V2 = k \times \arcsin(V1 \times 0.99/(VM+\alpha)) + Voffset \quad (2)$$

The output value V2 calculated by the equation (2) is shown in FIG. 5 by a one-dot chain line L2. As shown in FIG. 5, a difference of the output value V2 of the magnetic force detection value V1 at the time of full-open (86°) of the throttle valve 2 between before and after variation is Δd1, which is relatively small. In FIG. 5, a dotted line L3 shows an ideal sensor output, which varies linearly relative to the rotation angle. The ideal sensor output is equal to an output calculated by using the following equation (3).

$$k \times \arcsin(V1/VM) + Voffset \quad (3)$$

As shown in FIG. 5, the output value V2 (solid line L1) calculated by using the equation (1) is curved to deviate more from the linear ideal sensor output (dotted line L3) as the rotation angle (throttle open angle) of the throttle valve 2 increases.

The first embodiment is advantageous over a comparison example as described below. The comparison example has the same configuration physically as the first embodiment but calculates the output value V2 of the Hall IC 30 differently from the first embodiment. In the comparison example, the Hall IC 30 calculates the output value V2 by using the following equation (4).

$$V2 = k \times \arcsin(V1/VM) + Voffset \quad (4)$$

Figure 6:
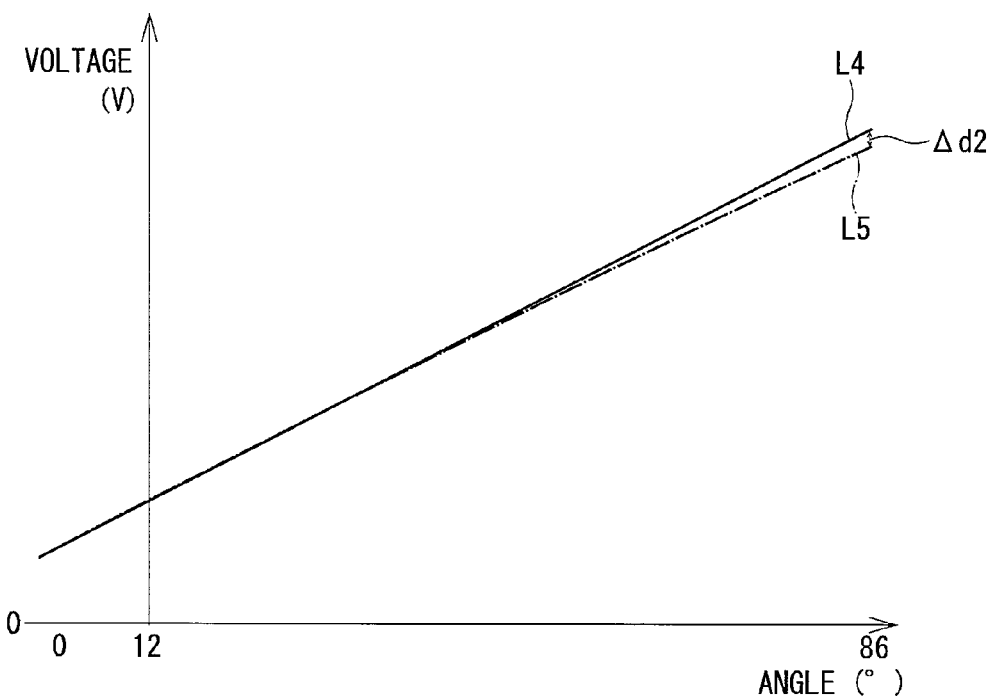
FIG. 6 is a graph showing an output voltage of a Hall IC of a rotation angle detecting device according to a comparison example.

That is, the comparison example also calculates the output value V2 in the similar calculation method as in the above-described conventional device. FIG. 6 shows by a solid line L4 the output value V2, which is outputted from the Hall IC 30 in the comparison example when the throttle valve 2 is being controlled. The solid line L4 coincides with the dotted line (FIG. 5), which shows the ideal sensor output.

A rotary driving apparatus according to the comparative example calculates the output value V2, by using the following equation (5), in a case that the magnetic force detection value V1 varies 1%.

$$V2 = k \times \arcsin(V1 \times 0.99/VM) + Voffset \quad (5)$$

The output value V2 calculated by using the equation (5) is shown by a one-dot chain line L5 in FIG. 6. As shown in FIG. 6, a difference of the output values V2 at the time of full-open state of the throttle valve 2 (86°) is Δd2 when the magnetic force detection value V1 varies 1%. This difference Δd2 is comparatively large.

Thus, according to the first embodiment, the difference of the magnetic force detection value V1 at around the full-open state of the throttle valve 2 before and after the same variation is smaller than that of the comparison example. The first embodiment is advantageous over the comparison example in that the variation in the magnetic force detection value V1 influences less on the output value V2.

As described above, according to the first embodiment, the magnetism sensing element 31 is provided to be relatively rotatable against the permanent magnets 51, 52. The magnetism sensing element 31 outputs the magnetic force detection value, which corresponds to the perpendicular component of the magnetic flux. The DSP 33 calculates, based on the magnetic force detection value V1 outputted from the magnetism sensing element 31, the output value V2, which corresponds to the relative rotation angle between the permanent magnets 51, 52 and the magnetism sensing element 31, and outputs the calculated value as the analog output voltage.

Further, the DSP 33 calculates the output value V2 by using the equation (1), in which V1, V2, VM, k, α and Voffset indicate the magnetic force detection value, the output value, the maximum value of the magnetic force detection value, the gain, the predetermined value and the predetermined offset value, respectively. As understood from the equation (1), it is possible to suppress the variation of V2 caused by the variation of V1 by setting a denominator of a value, which is calculated by using the arcsine function (arcsin) α, to be larger than VM. As a result, even when the magnetic force detection value V1 varies with reduction of magnetic force or positional deviation of the permanent magnets 51, 52, its influence on the output value V2 is reduced. The rotation angle can thus be detected with high accuracy. In the first embodiment, no magnetic flux collecting member such as a stator is provided. Thus the rotation angle detecting device 10 can be realized in simple configuration and with high detection accuracy.

(Second Embodiment)

A rotation angle detecting device according to a second embodiment will be described with reference to FIG. 7. The second embodiment has the similar physical configuration as the first embodiment but is different from the first embodiment in a processing operation of the DSP 33.

According to the second embodiment, the DSP 33 calculates the output value V2 based on the equation (1) and thereafter performs multipoint corrections to the calculated output value V2 before outputting. Specifically, the multipoint corrections are performed at sixteen points so that a first point corresponds to the output voltage produced at the full-closure state of the throttle valve 2 and a fifteenth point corresponds to the output voltage produced at the full-open state of the throttle valve 2. Thus the output value V2 is corrected to become closer to the ideal sensor output. Various parameters and programs for performing the multipoint corrections are stored in the memory 34.

Figure 7:
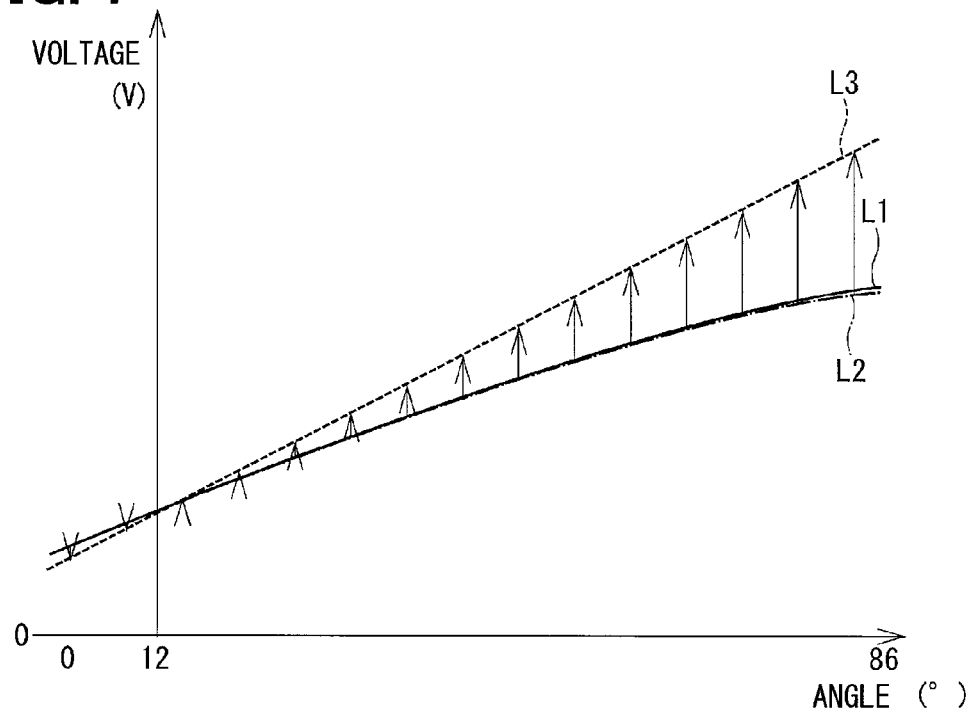
FIG. 7 is a graph showing an output voltage of a Hall IC of a rotation angle detecting device according to a second embodiment.

The output value V2 (solid line L1) calculated by using the equation (1) is thus corrected to become closer to the ideal sensor output (dotted line L3) as shown in FIG. 7. As a result, the output value V2 (one-dot chain line L2), which is produced when the magnetic force detection value V1 changes by 1% is also corrected to become closer to the ideal sensor output (dotted line L3).

As described above, according to the second embodiment, the DSP 33 corrects the output value V2 calculated by using the equation (1) at multiple points and output the corrected output voltage. In comparison to the first embodiment, straightness (linearity) of the output value V2 outputted from the Hall IC 30 is improved and robustness is enhanced against the variation of the magnetic force detection value V1 caused by the reduction of magnetic force or the positional deviation of the permanent magnets 51, 52.

(Third Embodiment)

Figure 8A:
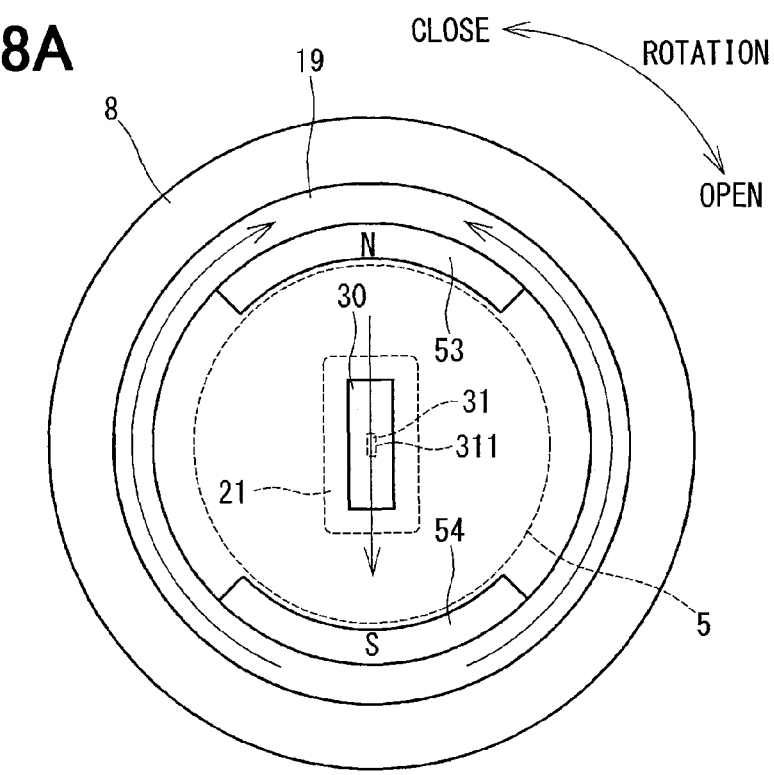
FIG. 8A and FIG. 8B are schematic views showing magnetism sensing elements and its surrounding part of rotation angle detecting devices according to a third embodiment and a fourth embodiment.

A rotation angle detecting device according to a third embodiment is different from that of the first and the second embodiments, as partly shown in FIG. 8A. According to the third embodiment, the holder 8 is provided with a yoke 19 of a generally cylindrical shape. Here the yoke 19 is provided in a manner that its axis coincides with the axis of the valve shaft 5. The axis of the yoke 19 thus passes the magnetism sensing element 31 of the Hall IC 30.

Permanent magnets 53, 54 are provided as the magnetism generating member inside the yoke 19 to be in a point-symmetry relative to the axis of the valve shaft 5, that is, to face each other. The permanent magnet 53 is magnetized such that its inside surface, which faces the axis of the yoke 19, is N-pole. The permanent magnet 54 is magnetized such that its inside surface, which faces the axis of the yoke 19 is S-pole. Thus, a magnetic circuit is formed such that the magnetic flux generated from the N-pole of the permanent magnet 53 jumps from the center of the permanent magnet 53 to the center of the permanent magnet 54 and the magnetic flux generated from the N-pole of the permanent magnet 54 flows to the S-pole of the permanent magnet 53 through the yoke 19. The Hall IC 30 is located at the center of the yoke 19. For this reason, the magnetic flux passes through the magnetism sensing element 31 irrespective of the rotational position of the permanent magnets 53, 54, that is, the rotation position of the valve shaft 5.

FIG. 8A shows a state of the Hall IC 30 and its vicinity in a case that the throttle valve 2 is in the full closure state (open degree 0). The angle, which is formed by the magnetism sensing surface 311 and the direction of magnetic flux jumping from the permanent magnet 53 to the permanent magnet 54, is about 0°. The perpendicular component of the magnetic flux passing through the magnetism sensing surface 311 is therefore 0 and, hence, the voltage outputted from the magnetism sensing element 31 is 0.

As described above, according to the third embodiment, the permanent magnets 53, 54 are arranged as the magnetism generating member to form the magnetic circuit. The Hall IC 30 and the permanent magnets 53, 54 are arranged such that the magnetic flux jumps from the permanent magnet 53 to the permanent magnet 54 in the direction, which is about 0° from the magnetism sensing surface 311, in a case that the throttle valve 2 is in the full closure state (open angle 0). This configuration can also detect the rotation angle with high accuracy in a case that the output value V2 is calculated based on the equation (1) by the DSP 33. Further, in the third embodiment, the rotation angle can be detected with much higher accuracy by performing the multipoint corrections on the output voltage calculated based on the equation (1).

(Fourth Embodiment)

Figure 8B:
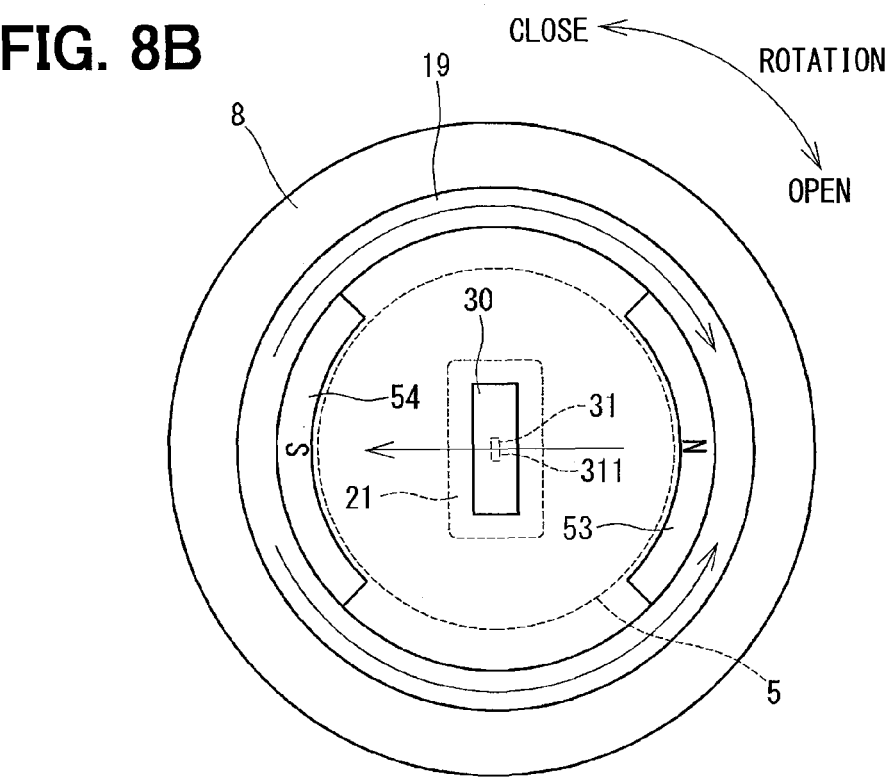

A rotation angle detecting device according to a fourth embodiment is also different from that of the first and the second embodiments, as partly shown in FIG. 8B. The fourth embodiment is different from the third embodiment in respect of the positional relation between the Hall IC 30 and the permanent magnets 53, 54 under the full closure state of the throttle valve 2, the method of calculation of the output value V2 and the like.

According to the fourth embodiment, the Hall IC 30 and the permanent magnets 53, 54 are arranged such that the magnetic flux jumps from the permanent magnet 53 to the permanent magnet 54 in the direction, which is about 90° from the magnetism sensing surface 311, in a case that the throttle valve 2 is in the full closure state (open angle 0). For this reason, the perpendicular component of the magnetic flux, which passes through the magnetism sensing surface 311, becomes maximum and hence the voltage outputted from the magnetism sensing element 31 becomes maximum correspondingly. The voltage outputted from the magnetism sensing element 31 is in a cosine waveform assuming that the horizontal axis indicates the relative rotation angle between the magnetism sensing element 31 and the permanent magnets 53, 54. The DSP 33 calculates the output value V2 by using the following equation 6.

$$V2 = k \times \arccos(V1/(VM+\alpha)) + Voffset \tag{6}$$

As described above, according to the fourth embodiment, the DSP 33 calculates the output value V2 based on the equation (6). As expressed in the equation (6), the variation of V2 caused by the variation of V1 can be suppressed as in the first embodiment, by increasing the denominator of a value, which is calculated based on the arccosine function (arccos), to be larger than VM by α. Accordingly, the output value V2 can be made to be influenced less relative to the variation of the magnetic force detection value V1 caused by the reduction of magnetic force, the positional deviation or the like of the permanent magnets 53, 54. As a result, the rotation angle can be detected with high accuracy.

(Other Embodiments)

As a further embodiment, the magnetism sensing element may be provided on a valve shaft side of the throttle valve and the permanent magnets may be provided on a cover side of the rotation angle detecting device. The magnetism generating member is not limited to the permanent magnets but may be an electromagnet.

As a still further embodiment, the predetermined value a in the equations (1) and (6) is not limited to be in the range of 0.2 to 0.25 folds of VM but may be smaller or larger than the range of 0.2 to 0.25 folds of VM. As a still further embodiment, the Hall IC may be configured to output the analog value from the DSP without through the DA converter.

As a still further embodiment, the magnetism sensing element is not limited to the Hall element but may be a magneto-resistive element or the like. The rotation angle detecting device is not limited to use for the detection of the rotation angle (open angle) of the throttle valve but may be used for detecting a rotation angle of a rotary body of, for example, an accelerator pedal or other apparatuses.

What is claimed is:

1. A rotation angle detecting device comprising:
    a magnetism sensing element provided relatively rotatable to a magnetism generating member to output a magnetic force detection value corresponding to a perpendicular component of magnetic flux applied from the magnetism generating member; and
    a processing part for calculating and outputting an output voltage, which corresponds to a relative rotation angle between the magnetism generating member and the magnetism sensing element, based on the magnetic force detection value outputted by the magnetism sensing element,
    wherein the processing part calculates the output voltage as $V2=k \times \arcsin(V1/(VM+\alpha))+V\text{offset}$ or $V2=k \times \arccos(V1/(VM+\alpha))+V\text{offset}$, in which V1, V2, VM, k, α and Voffset indicate the magnetic force detection value, the output voltage, a maximum value of the magnetic force detection value, a gain, a certain percentage of VM which is set to a positive value and a predetermined offset value.

2. The rotation angle detecting device according to claim 1, wherein:
    the processing part outputs the output voltage by performing multipoint corrections in an angular range of relative rotation so that the output voltage becomes closer to an ideal sensor output.

3. The rotation angle detecting device according to claim 1, wherein:
    the magnetism generating member is fixed to a value rotated by a motor, the magnetism sensing element is provided fixedly relative to a rotation of the valve, and the output voltage V2 calculated by the processing part is used to control the motor.

4. The rotating angle detecting device according to claim 3, wherein:
    the valve is a throttle valve provided in an intake system of an internal combustion engine.

5. The rotation angle detecting device according to claim 1, wherein the certain percentage is between 0.2 to 0.25.

* * * * *